United States Patent

[11] 3,579,061

| [72] | Inventor | Paul L. Waldon<br>Fort Edward, N.Y. |
| --- | --- | --- |
| [21] | Appl. No. | 761,437 |
| [22] | Filed | Sept. 23, 1968 |
| [45] | Patented | May 18, 1971 |
| [73] | Assignee | General Electric Company |

[54] INDIVIDUAL CURRENT-LIMITING FUSE FOR THE ROLLS OF A MULTIPLE ROLL CAPACITOR
6 Claims, 3 Drawing Figs.

| [52] | U.S. Cl. | 317/247,<br>317/12, 317/250 |
| --- | --- | --- |
| [51] | Int. Cl. | H01g 1/11 |
| [50] | Field of Search | 317/12,<br>242, 247, 256, 258, 259 |

[56] References Cited
UNITED STATES PATENTS

| 1,255,597 | 2/1918 | Giles | 317/242 |
| --- | --- | --- | --- |
| 3,178,622 | 4/1965 | Paul | 317/256 |
| 3,236,976 | 2/1966 | Rayno | 317/256X |
| 3,396,319 | 8/1968 | Robinson | 317/12X |
| 3,424,957 | 1/1969 | Katchman | 317/249 |

Primary Examiner—E. A. Goldberg
Attorneys—James J. Lichiello, Nathan J. Cornfeld, M. M. Goldenberg, Frank L. Neuhauser and Oscar B. Waddell ABSTRACT: A multiple roll capacitor is disclosed wherein each individual roll section is protected by an isolated current-limiting fuse as a part of the roll tap strap which passes through a central portion of the roll. The current-limiting fuse operates to remove individual defective rolls from the capacitor circuit without significantly adversely affecting the continued operation of the remaining rolls.

Patented May 18, 1971

3,579,061

INVENTOR:
PAUL L. WALDON,
BY James J. Lickiello
HIS ATTORNEY.

INDIVIDUAL CURRENT-LIMITING FUSE FOR THE ROLLS OF A MULTIPLE ROLL CAPACITOR

BACKGROUND OF THE INVENTION

1. Field of the Invention

This invention relates to capacitor fusing and more particularly to a multiple roll capacitor wherein individual capacitor roll sections include isolated current-limiting fuses which operate to remove an individual roll from the capacitor circuit without significantly adversely affecting the operation of the remaining rolls in the circuit.

2. Description of the Prior Art

Larger capacitors such as power capacitors or power factor correction capacitors usually include a plurality of capacitor roll sections within a single casing to provide the desired capacitance. More particularly for example, power factor capacitors such as illustrated and described in U.S. Pat. No. 3,219,892 to Wurster, assigned to the same assignee as the present invention, and also capacitors as described in U.S. Pat. No. 3,363,156 to Cox, also assigned to the same assignee as the present invention, employ a substantial number of individual capacitor roll sections arranged within a single casing unit. During the operation of these capacitors, in the event of certain deleterious conditions, a short circuiting within a particular roll section may occur with the result that the failure of a single roll section results in a failure of the entire capacitor. Accordingly, it is desirable in many instances to provide fuse-type protective devices associated with the individual rolls in a multiroll capacitor in order that a failure of a single roll will not significantly adversely affect the general operation of the capacitor, or the effectiveness of the remaining capacitor roll sections in the capacitor.

A number of problems are associated with prior attempts to apply individual fuses to individual capacitor roll sections in a capacitor. For example, in many instances the failure of an individual roll produces arcing and gas release which are unfavorable to continued capacitor operation, or which provide contaminants in the impregnant in the capacitor leading to early capacitor failure. Furthermore the failure of a particular fuse is generally associated with arcing which may cause burn-through or localized hot spots in adjacent insulating materials. It is the effect of arcing on the impregnant as well as the resulting burning which proves the more important deterrent for internal fusing of a capacitor.

SUMMARY OF THE INVENTION

Accordingly, it is an object of this invention to provide an improved fused multiple roll capacitor where individual rolls include individual current-limiting fuses.

It is yet another object of this invention to provide a multiple roll capacitor wherein multiple rolls within the capacitor contain individual isolated current-limiting fuses associated with the roll tap strap.

It is yet another object of this invention to provide a multiple roll capacitor wherein each roll includes a fuse section in the roll tap strap internal of the roll section and operable to remove the roll from the capacitor circuit upon failure of the roll section.

Briefly described this invention in one of its preferred forms includes a number of individual capacitor roll sections in a power capacitor where each roll section includes a fuse structure as a part of the roll tap strap. The fuse section part of the tap strap is positioned generally centrally and remotely within the roll to be tightly enclosed by the roll. The fuse structure is further confined in a restricted volume of the capacitor impregnant preferably a chlorinated aromatic hydrocarbon impregnant such as chlorodiphenyl, and particularly trichlorodiphenyl together with an epoxide-scavenging additive.

BRIEF DESCRIPTION OF THE DRAWINGS

This invention will be better understood when taken in connection with the following description and the drawings in which.

DESCRIPTION OF THE PREFERRED EMBODIMENTS

Figure 1:
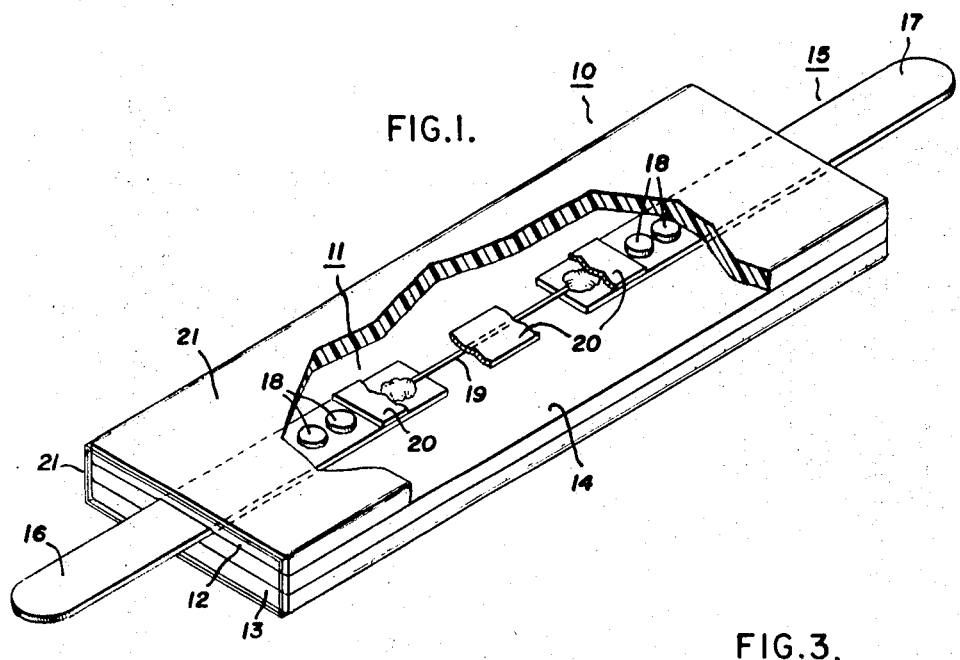
FIG. 1 is one preferred embodiment of the fuse structure of this invention.

Referring now to FIG. 1 there is illustrated one exemplary fuse structure which has been utilized with good results in individual rolls in power capacitors of about 150 KVAR capacity. In FIG. 1, fuse structure 10 includes a first assembly 11 positioned between a pair of opposed rectangular insulating members 12 and 13 which may be an insulating fiber or paper material. Fuse assembly 11 generally includes a base supporting member 14 of an insulating material such as an electrically insulating fiberboard which is interposed between insulating members 12 and 13.

Suitable affixed to the supporting member 14 is the usual tap strap which is in common use in power capacitor structures as the electrical lead into the roll sections. In fuse assembly 11 however the tap strap which is denoted as 15, is provided in two sections 16 and 17 which are axially spaced apart on member 14, and suitably attached thereto for example by mechanical means such as stakes or rivets 18. Tap strap 15 is usually of aluminum, and in one preferred embodiment of this invention is an aluminum strip of about 0.375 inch width. Such an aluminum strip may be attached to support member 14 by being stitched or threaded through a series of slits therein.

Between the spaced-apart tap sections 16 and 17 there is provided a fuse link 19 which severs or otherwise separates upon overcurrent conditions in tap member 15. Fuse link 19 is chosen to be of a material and a configuration which will effectively interrupt under the appropriate overcurrent conditions. Fuse link 19 may expeditiously be a reduced section of the tap strap 15 where excess material is removed by a punching or notching process. The reduced section may then be a rectangular or round section of aluminum, or other tap material of the desired cross-sectional and length dimension. Furthermore link 19 may be a separate link member of an appropriate size, configuration, and metal which is suitably joined to sections 16 and 17.

It has been found effective for the purposes of the present invention to provide fuse link 19 in the form of a thin wire or thin rod. More particularly in a preferred practice of this invention, a tinned copper wire has been employed of about 0.008 to about 0.016 inch thicknesses and with an effective length from about 1 to 4 inches between connections. A copper wire is preferred for a number of reasons including, more accurate predictability characteristics, minimal dimensional variances, and adaptability to various changes over a wide range of conditions. Tinning of the copper is provided in order to protect the copper from contact with such impregnants as the chlorinated hydrocarbons, which deleteriously react with copper to contaminate the impregnant. For general application to a 150 KVAR capacitor, a wire bridge member of 10 mil thickness and of about 2.5 inches in effective length has been found to provide excellent fault-clearing results. Fuse link 19 is joined to each end of the tap section 16 and 17 by suitable joining means including riveting, welding and soldering, with soldering being an exemplary and preferred process.

In the assembly of the fuse 11 of this invention, a significant portion of fuse link 19 is covered or engaged by a very thin electrically insulating paper tape 20 which not only covers the fuse wire 19, but also effectively restricts the movement of the fuse wire 19 with respect to the supporting member 14. Thereafter cover member 12 is placed over the insulating member 14 and a further cover member 13 is placed on the underside of supporting member 14. The three members 12, 13 and 14 is usually wrapped with one or more turns of a thin electrically insulating film such as polypropylene film 21, or are otherwise provided with a suitable enclosure in order to maintain the parts of the assembly in a relatively tight and close engagement.

It is an important feature of this invention that only a limited amount of impregnant be in contact with fuse link 19 and this limited amount of impregnant be relatively isolated from the main impregnant supply in the capacitor. The limited impregnant feature is a significant contribution to current-limiting action of the fuse of this invention.

There are a number of elements and arrangements which may be utilized to provide a limited amount of impregnant next adjacent fuse link 19. In the FIG. 1 embodiment the paper tape 20 is expeditiously employed in large part for this purpose. Paper tape 20 is porous material which is easily impregnated by a dielectric liquid impregnant and thus serves to limit the quantity of impregnant in contact with fuse link 19. At the same time paper tape 20 closely engages fuse link 19 and serves to aid in the confinement of fuse link 19 so that the combination provides substantial current limiting action during the interrupting operation. Paper tape 20 may be replaced by tapes of other materials which may also be in folded or channel form. Other substitutes include a porous tube fitted over fuse link 19 or a relatively impervious tube which is of a size which will permit a limited quantity of impregnant in contact with fuse link 19. Such modified tapes and tubes may then serve as the principal enclosing and confining means for fuse link 19, and parts of tab sections 16 and 17 if desirable, although a further support wrapper would be desirable.

The fuse link 19 of this invention may also be enclosed and confined under the conditions described by other means, such as for example by suitable encasing or jacketing fuse link 19 alone, or with one or more of the other parts, including tab sections 16 and 17, with some other enclosing means including direct wrapping or casting or sheathing in a synthetic resin material.

Figure 2:
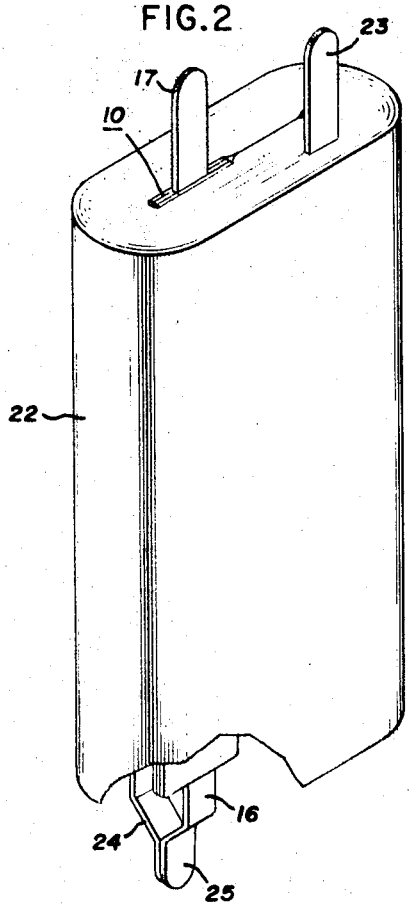
FIG. 2 illustrates one preferred arrangement wherein the invention of FIG. 1 is positioned within the center of a capacitor roll section.

Fuse assembly 10 is preferably separately enclosed and confined within a capacitor roll section center as illustrated in FIG. 2. Referring now to FIG. 2 there is disclosed an exemplary capacitor roll section 22 which usually comprises a convolute of a composite of alternate strips of a foil electrode and dielectric material, for example, a polyolefin or polypropylene dielectric as more fully described in the noted U.S. Pat. No. 3,363,156 to Cox. The roll section 22 is usually wound on a mandrel in a generally circular form and then flattened, with relative ease, to the ovallike cross section as illustrated in FIG. 2. When the convolute section 22 is removed from the winding machine, and the winding arbor, the fuse structure 10 of FIG. 1 is inserted in the central opening of section 22 and section 22 is then flattened about the fuse structure 10. It is preferred that the fuse structure 10 be positioned in the flattened central opening along one narrow edge or side as illustrated in FIG. 2. The roll center is expeditiously adaptable to receive and confine the fuse assembly, and its sufficient impregnation in that location is more certain. Fuse link 19 is also preferably placed in the central portion of the roll remotely with respect to the roll edges, not only for confinement, but also for isolation of the fuse structure 10 from the overall supply of impregnant and also from other fuse assemblies.

In FIG. 2 the fuse structure 10 acts as one of the tabs or tap straps of the capacitor section 22. A tab or tap strap, otherwise known as a capacitor lead, is suitably connected to each electrode of the usual pair of electrodes in a capacitor roll section such as section 22 of FIG. 2. For example, one of these tap straps for one electrode is illustrated as tab 23 exiting at the upper surface of section 22. The other tab for the other electrode is shown at the bottom of section 22 as tap strap 24. However, the tap strap 24 exiting from the bottom of roll section 22 is joined at 25 to the tap section 16 of fuse assembly 10 (FIG. 1) and suitably integrally connected therewith, or sections 16 and 24 may be one continuous tab section. Therefore, the other tap strap section of fuse assembly 10, i.e., tap section 15, serves as the tap for the electrode of opposite polarity to that of tap strap 23.

Isolation of fuse links 19 also includes the physical separation of plural fuse links 19 for plural roll sections. Where plural relatively unconfined fuse links 19 were mounted on a support member in close side-by-side relationship externally of the capacitor roll sections, it was found that operation of one fuse adversely affected adjacent fuses. Accordingly, in relatively close quarters where a large number of fuses are required optimum physical separation and enclosing and confining means are critical.

It is a distinct advantage of roll center positioning that the fuse link 19 is electrically located very near the roll section. By this means inductance is retained at a minimum. In the practice of this invention it was found that more remote locations introduced sufficient inductance to adversely affect fuse operation.

Isolation and physical separation may also be obtained, and circuit induction minimized, where the fuse of this invention is positioned centrally between individual roll sections. For example, the fuse assembly 10 of FIG. 1 may be positioned between a pair of roll sections 22 of FIG. 3. In this manner adjacent roll section aids in compressing and confining the fuse assembly much in the same way as if the fuse assembly were positioned in a roll center.

The fuse structure 10 of this invention as well as its described modifications may also be inserted in other portions of the roll 22 but with additional insertion problems as well as roll configuration and electrical connection disadvantages. Fuse assembly 11 alone, or fuse link 19 alone, as unenclosed fuses are more expeditiously inserted in other parts of roll 22, and may also be utilized in the roll center. However, proper close confinement and restricted impregnant contact is more difficult to attain by this method. Operation of such unenclosed fuses has been found to spread the dielectric liquid contaminants, resulting from fuse operation, rapidly throughout the dielectric liquid and other parts of the capacitor. Furthermore considerable burning of adjacent materials takes place which adds to the contamination. Some additional wrapper or cover about fuse link 19, although not as extensive as that of FIG. 1, ameliorates the foregoing conditions. In this connection a modified fuse assembly may be incorporated in one or more turns of the dielectric strip of roll 22 just prior to winding of roll 22 about the fuse.

Figure 3:
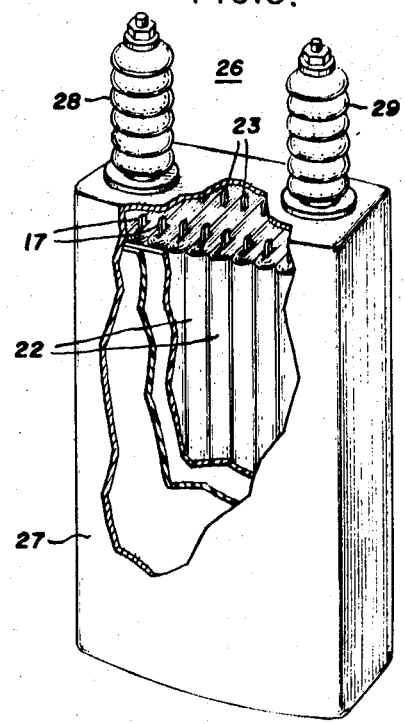
FIG. 3 is an exemplary power factor capacitor to which the fuse structure of this invention is particularly applicable.

The capacitor roll section 22 is suitably contained within a capacitor casing and may serve as the only capacitor section in the casing or it may be one of many capacitor sections in a casing. A kind of capacitor to which the fuse assembly 10 of this invention is particularly adaptable as shown in FIG. 3. Referring now to FIG. 3 there is an exemplary form of a power capacitor 26. Power capacitor 26 includes a casing 27 containing a number of roll sections such as roll sections 22 of FIG. 3. Roll sections 22 are suitably connected by means of their tap straps and other conducting members to terminals 28 and 29 projecting from the casing 27.

Casing 27 as well as the capacitor sections 22 are impregnated with a suitable dielectric liquid impregnant. Among those dielectric liquid impregnants which are more commonly employed in power capacitors are the Pyranol liquids or the Arochlor liquids, terms used to describe halogenated aromatic compounds, usually the chlorinated diphenyls, and more particularly trichlorodiphenyl. This dielectric liquid impregnant is cause to impregnate the fuse assembly 10 to provide a limited amount of impregnant along and about the fuse link 19. It has been discovered in this invention that the chlorinated aromatic hydrocarbons such as trichlorodiphenyl are extremely resistant to deleterious effects caused by arcing of the fuse link 19. During operation of the fuse assembly of this invention overcurrent conditions cause fuse link 19 to melt, or particularly to evaporate. This condition causes an arc to be established between the remaining portions of encased wire 19. However, the limited amount of or thin film of impregnant surrounding the encased fuse link 19 provides a shield for the arc and confines the arc so that the fuse acts as a current-limiting device. It is important that the amount of impregnant surrounding the fuse link 19 be limited and maintained generally out of free-flowing contact with the remainder of the impregnant. For one reason, it is desirable to closely confine the fuse link 19 in the roll or fuse assembly so that the fuse becomes current-limiting during operation. The close confinement, and evaporation of the dielectric impregnant with concurrent pressure rise contribute to the current-limiting action. For another reason, any contaminants brought about during fuse operation is restricted to only a small amount of impregnant and this impregnant is relatively isolated from the main source of impregnant. Accordingly the deleterious effects of contaminants caused by arcing in fuse 10 are effectively confined within a small area in the capacitor, and after long periods of time little if any migration of contaminant to other parts of the capacitor has been found.

However, in connection with contaminants, it has been discovered that the fuse assembly 10 of this invention is more effective when the liquid impregnant includes an epoxide stabilizer or scavenger, examples being those disclosed in U.S. Pat. Nos. 3,242,401 to Katchman and 3,242,402 to Stahr, each assigned to the same assignee as the present invention. Epoxide scavengers contribute greatly to the stabilization of power factor in power capacitors. It has been discovered that these epoxides when in the presence of the arc formed by the severance of fuse link 19 effectively scavenge or combine with contaminant materials to protect the remainder of the dielectric liquid impregnant in the capacitor section. The confinement and isolation provides sufficient time for the scavenging material to fully react with the contaminants. A number of fuse links 19 were severed by overcurrent conditions in a presence of trichlorodiphenyl with an epoxide additive. Thereafter the trichlorodiphenyl material, plus the contaminants and epoxide additive, was utilized to impregnate further capacitor sections. Tests of these further capacitor sections indicate that the presence of the epoxide had greatly minimized potential failures due to the arc contaminants.

Because of the noted advantages of a trichlorodiphenyl impregnant and an epoxy additive, the fuse assembly of this invention may be placed in other parts of the capacitor casing and suitably confined. For example, the fuse assembly 10 may be placed between roll sections 23 as well as above or below roll sections 23, with adequate enclosure, confinement and isolation.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

I claim:
1. A capacitor having a plurality of current-limiting fuse devices therein comprising in combination
   a. a casing
   b. a plurality of capacitor roll sections having tap members extending therefrom in said casing
   c. a current-limiting fuse member positioned within each said roll section and remotely in the central portion thereof to be tightly confined thereby
   d. each said fuse member comprising an intermediate section of a tap member
   e. said intermediate section comprising a thin metal conductor of a melting point of above about 600° C. and of a conductivity and cross section which will sever upon overcurrent conditions of predetermined degree and time
   f. enclosing and confining means about said intermediate section to provide minimum space therebetween and coextensive therewith to limit the current flow through said tap member upon severance of said intermediate section.
   g. a chlorinated diphenyl liquid impregnant in said capacitor section and relatively isolated in said minimum space by said enclosing and confining means.
2. The invention as recited in claim 1 wherein the part at least of said enclosing and confining means is of a porous nature and engages said intermediate section.
3. The invention as recited in claim 1 wherein said intermediate section is a separate section joined to said tap member.
4. The invention as recited in claim 1 wherein said impregnant includes an epoxide additive.
5. In a power capacitor the combination comprising
   a. a casing
   b. a plurality of capacitor roll sections with tap strap members extending therefrom in said casing
   c. said roll sections being impregnated with a chlorinated aromatic hydrocarbon and an epoxide additive
   d. a current-limiting fuse structure in each of said roll sections and remotely and centrally positioned therein
   e. said fuse structure comprising
      1. a high melting point fuse link joined to separated sections of a tap strap for its said roll
      2. a support means of insulating material supporting said fuse link
      3. enclosing and confining means for said fuse link
      4. a part at least of said enclosing and confining means comprising a porous member engaging and covering said fuse link and engaging said support means to retain said fuse link therebetween
      5. said impregnant impregnating said porous member
      6. said enclosing and confining means being operative in conjunction with said fuse link to provide a current-limiting action of said fuse link with minimal contaminant generation.
6. The invention as recited in claim 5 wherein said fuse structure comprises
   a. an insulating support member
   b. a pair of tap strap sections secured to said insulating member
   c. a fuse link wire bridging said tap strap sections
   d. a pair of insulating board members confining said support member therebetween
   e. and an insulating wrapper surrounding and confining said insulating members.